United States Patent
Komaki et al.

(10) Patent No.: US 12,421,438 B2
(45) Date of Patent: Sep. 23, 2025

(54) ALUMINA POWDER, RESIN COMPOSITION, AND HEAT DISSIPATION COMPONENT

(71) Applicant: DENKA COMPANY LIMITED, Tokyo (JP)

(72) Inventors: Takafumi Komaki, Tokyo (JP); Junya Nitta, Tokyo (JP); Yoshiaki Okamoto, Tokyo (JP); Masakazu Hirata, Tokyo (JP); Genta Karino, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 565 days.

(21) Appl. No.: 17/913,094

(22) PCT Filed: Mar. 24, 2021

(86) PCT No.: PCT/JP2021/012309
§ 371 (c)(1),
(2) Date: Sep. 20, 2022

(87) PCT Pub. No.: WO2021/200491
PCT Pub. Date: Oct. 7, 2021

(65) Prior Publication Data
US 2023/0193103 A1 Jun. 22, 2023

(30) Foreign Application Priority Data
Mar. 31, 2020 (JP) .................. 2020-063554

(51) Int. Cl.
C09K 5/14 (2006.01)
C08K 3/08 (2006.01)
C08K 7/18 (2006.01)

(52) U.S. Cl.
CPC .................. *C09K 5/14* (2013.01); *C08K 3/08* (2013.01); *C08K 7/18* (2013.01); *C08K 2003/0812* (2013.01); *C08K 2201/003* (2013.01); *C08K 2201/006* (2013.01)

(58) Field of Classification Search
CPC ... C09K 5/14; C08K 3/08; C08K 7/18; C08K 2003/0812; C08K 2201/003;
(Continued)

(56) References Cited

U.S. PATENT DOCUMENTS 5,302,368 A   4/1994 Harato et al.
8,834,833 B2  9/2014 Schulze-Isfort et al.
(Continued)

FOREIGN PATENT DOCUMENTS

CN  101528604 A  9/2009
JP  H08-290914 A  11/1996
(Continued)

OTHER PUBLICATIONS

May 18, 2021 International Search Report issued in International Patent Application No. PCT/JP2021/012309.

*Primary Examiner* — Anthony J Zimmer
*Assistant Examiner* — Joshua Maxwell Speer
(74) *Attorney, Agent, or Firm* — Oliff PLC (57) ABSTRACT

The alumina powder contains: a first alumina particle having an average particle diameter of 0.1 μm or more and less than 1 μm; a second alumina particle having an average particle diameter of 1 μm or more and less than 10 μm; and a third alumina particle having an average particle diameter of 10 μm or more and 100 μm or less, wherein each of the average particle diameters is a particle diameter measured using laser light diffraction scattering particle size distribution analyzer, average sphericity of first alumina particle having projected area equivalent circle diameter of 0.1 μm or more and 1 μm or less as determined by microscopy is 0.80 or more and 0.98 or less, a specific surface area of first alumina particle is 1.9 m²/g or more and 20.0 m²/g or less, and content ratio of an α crystal phase is 80% by mass or more.

8 Claims, 1 Drawing Sheet

(58) Field of Classification Search
CPC ...... C08K 2201/006; C08K 2003/2227; C08K 2201/001; C08K 2201/005; C08K 2201/014; C08K 3/22; C01P 2004/32; C01P 2004/51; C01P 2004/61; C01P 2004/62; C01P 2006/12; C01P 2006/22; C01P 2006/32; C01P 2002/90; C01F 7/441; C01F 7/02; C08L 101/00
See application file for complete search history.

(56) References Cited

U.S. PATENT DOCUMENTS

| | | | |
|---|---|---|---|
| 2010/0051855 A1* | 3/2010 | Kunitomo | C01F 7/02 252/75 |
| 2017/0210886 A1 | 7/2017 | Ikeda et al. | |
| 2019/0107164 A1 | 4/2019 | Sun et al. | |

FOREIGN PATENT DOCUMENTS

| | | |
|---|---|---|
| JP | 2001-316111 A | 11/2001 |
| JP | 2006-258422 A | 9/2006 |
| JP | 2007-031163 A | 2/2007 |
| JP | 2009-164093 A | 7/2009 |
| JP | 2009-274929 A | 11/2009 |
| JP | 2012-031402 A | 2/2012 |
| TW | 200301223 A | 7/2003 |
| WO | 2015/056523 A1 | 4/2015 |
| WO | 2016/017637 A1 | 2/2016 |
| WO | 2017/170560 A1 | 10/2017 |
| WO | 2018/235920 A1 | 12/2018 |

* cited by examiner

ALUMINA POWDER, RESIN COMPOSITION, AND HEAT DISSIPATION COMPONENT

TECHNICAL FIELD

The present invention relates to an alumina powder, a resin composition, and a heat dissipation component.

BACKGROUND ART

In recent years, the miniaturization and higher performance of an electrical device have been progressing. With the miniaturization and higher performance, the packaging density of an electronic component constituting an electrical device is increasing, and the need to effectively dissipate heat generated from an electronic component is increasing.

In addition, in a power device application such as an electric vehicle that can suppress an environmental load, a high voltage may be applied to an electronic component or a large current may flow therethrough. In this case, a large amount of heat is generated, and in order to deal with the large amount of heat generated, the need to dissipate heat more effectively than before is increasing. As a technique for meeting such a demand, for example, Patent Document 1 discloses a resin composition including three alumina fillers. In addition, Patent Document 2 discloses an alumina-blended particle including a spherical alumina particle and a non-spherical alumina particle, and a resin composition including the alumina-blended particle.

CITATION LIST

Patent Document

Patent Document 1: Japanese Patent Laid-Open No. 2009-164093
Patent Document 2: Japanese Patent Laid-Open No. 2009-274929

SUMMARY OF INVENTION

Technical Problem

However, Patent Document 1 and 2 have the following problem: because of the large specific surface area of the alumina particle, the poor shape thereof, and the like, thickening occurs when the resin is filled with the alumina particle, making it difficult to highly fill the resin with the alumina particle. Because of this, the formability thereof is poor, and it is difficult to obtain a heat dissipation component having high thermal conductivity.

The present invention has been made in view of such a problem, and an object thereof is to provide an alumina powder that can suppress an increase in viscosity when a resin is filled therewith and realize high thermal conductivity of a resin composition including the resin, and a resin composition and a heat dissipation component including the alumina powder.

Solution to Problem

The present inventors have carried out diligent and extensive research to achieve the above object, and as a result, have found that an alumina powder including a specific first alumina particle, a specific second alumina particle, and a specific third alumina particle can suppress an increase in viscosity when a resin is filled therewith and that it is possible to obtain a resin composition and a heat dissipation component that can realize high thermal conductivity by including the alumina powder, and have completed the present invention.

That is, the present invention is as follows.

[1] An alumina powder containing: a first alumina particle having an average particle diameter of 0.1 μm or more and less than 1 μm; a second alumina particle having an average particle diameter of 1 μm or more and less than 10 μm; and a third alumina particle having an average particle diameter of 10 μm or more and 100 μm or less, wherein each of the average particle diameters is a particle diameter measured using a laser light diffraction scattering particle size distribution analyzer, an average sphericity of the first alumina particle having a projected area equivalent circle diameter of 0.1 μm or more and 1 μm or less as determined by microscopy is 0.80 or more and 0.98 or less, a specific surface area of the first alumina particle is 1.9 $m^2/g$ or more and 20.0 $m^2/g$ or less, and a content ratio of an α crystal phase is 80% by mass or more.

[2] The alumina powder according to [1], wherein the content ratio of the α crystal phase in the alumina powder is 60% by mass or more.

[3] A resin composition containing a resin and the alumina powder according to [1] or [2].

[4] The resin composition according to [3], wherein the resin contains at least one selected from the group consisting of a silicone resin, an epoxy resin, a urethane resin, and an acrylic resin.

[5] A heat dissipation component containing the alumina powder according to [1] or [2], or the resin composition according to [3] or [4].

Advantageous Effects of Invention

According to the present invention, an alumina powder that can suppress an increase in viscosity when a resin is filled therewith and realize high thermal conductivity of a resin composition including the resin, and a resin composition and a heat dissipation component including the alumina powder can be provided.

DESCRIPTION OF EMBODIMENT

Hereinafter, an embodiment for practicing the present invention (hereinafter, simply referred to as "the present embodiment") will be described in detail. The following present embodiment is an illustration for describing the present invention, and the present invention is not limited only to the present embodiment.

The alumina powder of the present embodiment includes a specific first alumina particle, a specific second alumina particle, and a specific third alumina particle.

[Alumina Powder]
(First Alumina Particle and Method for Producing the Same)

The first alumina particle according to the present embodiment has an average particle diameter of 0.1 μm or more and less than 1 μm. By using the first alumina particle, a resin composition can be filled with the alumina particle in a high proportion. The average particle diameter of the first alumina particle is preferably 0.2 µm or more and 0.9 µm or less, and more preferably 0.3 µm or more and 0.8 µm or less.

In the present embodiment, the average particle diameter is measured using a laser light diffraction scattering particle size distribution analyzer. A specific measurement method is as described in Examples.

The average sphericity of the first alumina particle of the present embodiment is 0.80 or more and 0.98 or less. When the alumina powder includes the first alumina particle having an average sphericity of 0.80 or more, thickening is less likely to occur when a resin is filled with the alumina powder. When the alumina powder includes the first alumina particle having an average sphericity of 0.98 or less, the contact between the first alumina particles and between the first alumina particle and another alumina particle becomes more sufficient and the contact area becomes larger, and as a result, a resin composition and a heat dissipation component having higher thermal conductivity can be obtained. The average sphericity is measured by the following microscopy. That is, a particle image taken using a scanning electron microscope, a transmission electron microscope, or the like is taken into an image analyzer, and the projected area (A) and the perimeter (PM) of the particle are measured from the photograph. When the area of a perfect circle having the same perimeter as the perimeter (PM) is (B), the sphericity of the particle is A/B. Therefore, when envisioning a perfect circle having the same perimeter as the perimeter (PM) of a sample, $PM=2\pi r$ and $B=\pi r^2$, and thus $B=\pi \times (PM/2\pi)^2$, and the sphericity of each particle is sphericity$=A/B=A\times 4\pi/(PM)^2$. The sphericity of each of 200 arbitrary particles having a projected area equivalent circle diameter in a predetermined range is determined as described above, and the arithmetic mean value thereof is taken as the average sphericity. A specific measurement method is as described in the Examples. In addition, the projected area equivalent circle diameter refers to the diameter of a perfect circle having the same projected area as the projected area (A) of a particle. When determining the average sphericity of the first alumina particle, the above "predetermined range" is 0.1 µm or more and 1 µm or less.

The specific surface area of the first alumina particle is, from the viewpoint of obtaining a resin composition and a heat dissipation material in which the contact resistance at the interface with a resin is low and an increase in viscosity is more unlikely to occur, 1.9 $m^2/g$ or more and 20.0 $m^2/g$ or less and preferably 2.0 $m^2/g$ or more and 6.0 $m^2/g$ or less. In the present embodiment, the specific surface area is measured by the BET flow method, and a specific measurement method is as described in the Examples.

The content ratio of the α crystal phase in the first alumina particle is, from the viewpoint of obtaining a resin composition and a heat dissipation material having higher thermal conductivity, 80% by mass or more and preferably 85% by mass or more. The content ratio of the α crystal phase in the first alumina particle is preferably higher than the content ratio of the α crystal phase in the third alumina particle described later, from the viewpoint of increasing the thermal conductivity more efficiently. The upper limit is, for example, 100% by mass. In the present embodiment, the content ratio of the α crystal phase is measured by a calibration curve method using an X-ray diffractometer. A specific measurement method is as described in the Examples.

According to the alumina powder of the present embodiment, an increase in viscosity can be suppressed when a resin is filled with the alumina powder, and a resin composition and a heat dissipation component including the alumina powder can realize high thermal conductivity. The reason for this is not clear, but the present inventors presume as follows. However, the reason is not limited to the following.

In a resin composition and a heat dissipation component including an alumina particle and a resin, heat propagates through the alumina particle in the resin, and thus it is preferable to contain a particle that has a large average particle diameter, as do the second alumina particle and the third alumina particle, because the heat transfer path is large. However, the second alumina particle and the third alumina particle have each a large average particle diameter, a gap is easily formed between one particle thereof and another, and needs to be filled the gap with the resin, and thus when the resin is filled with these alumina particles in a high proportion, this causes an increase in viscosity. Because of this, it is difficult to fill the resin with these alumina particles in a high proportion. If the filling ratio of the particles is low, the gap between the particles is further increased and a heat path between the particles is inhibited, and thus in the end, it becomes difficult to realize high thermal conductivity. On the other hand, the first alumina particle has high average sphericity, has a smaller average particle diameter than the second alumina particle and the third alumina particle, and has a smaller specific surface area than an alumina particle having a comparable average particle diameter, and thus the contact resistance at the interface between the alumina particle and the resin can be lowered. Further, the first alumina particle itself has a high a crystallization ratio of 80% by mass or more, and thus the thermal conductivity is high. However, the first alumina particle has a small average particle diameter, and thus the heat path is also small, and the first alumina particle alone cannot efficiently conduct heat. Because of this, it is difficult to realize high thermal conductivity only with the first alumina particle. Therefore, in the alumina powder of the present embodiment, the first alumina particle having a small average particle diameter is blended together with the second alumina particle and the third alumina particle so that the gap between particles of the second alumina particle and the third alumina particle can be filled with the first alumina particle. The first alumina particle has low contact resistance at the interface between the alumina particle and the resin and high average sphericity, and thus the gap between particles of the second alumina particle and the third alumina particle is filled with the first alumina particle with fluidity, and thus the resin can be filled with the alumina powder including these particles in a high proportion. Then, the first alumina particle has high thermal conductivity, and thus it is easy to form a heat path at the interfaces between the first alumina particle and both the second alumina particle and the third alumina particle, making it possible to realize high thermal conductivity. Further, the first alumina particle flows in a gap between the second alumina particle and the third alumina particle to fill the gap, and even after the filling, the individual particles are in a state where they are difficult to aggregate with each other, and thus an increase in viscosity is also unlikely to occur.

The first alumina particle according to the present embodiment can be produced, for example, according to the production methods described in Japanese Patent Laid-Open No. 6-191835, Japanese Patent Laid-Open No. 7-187663, and Japanese Patent Laid-Open No. 8-290914. In addition, two or more alumina particles may be mixed to provide the first alumina particle. In the case of the mixing, additivity approximately holds for the average particle diameter, the average sphericity, the specific surface area, and the content ratio of the α crystal phase, and thus it is possible to make an appropriate adjustment such that the average particle diameter, the average sphericity, the specific surface area, and the content ratio of the α crystal phase described above have target values.

(Second Alumina Particle and Method for Producing the Same)

The second alumina particle according to the present embodiment has an average particle diameter of 1 μm or more and less than 10 μm. The second alumina particle is blended in order to improve the fluidity of the alumina particle in the resin. With only the first alumina particle and the third alumina particle, if the resin is filled with the alumina particles to the extent that high thermal conductivity of the resin composition can be realized, the filling ratio of the alumina particles tends to be too high, it is difficult to obtain the fluidity, and it is difficult to suppress an increase in viscosity when the resin is filled with the alumina powder. The average particle diameter of the second alumina particle is preferably 2 μm or more and 9 μm or less, and more preferably 3 μm or more and 8 μm or less.

In the second alumina particle of the present embodiment, the average sphericity of the second alumina particle having a projected area equivalent circle diameter in a predetermined range as determined in the same manner as above except that the "predetermined range" is more than 1 μm and 10 μm or less is preferably 0.80 or more and 0.98 or less and more preferably 0.85 or more and 0.97 or less. When the alumina powder includes the second alumina particle having an average sphericity of 0.80 or more, the fluidity of the alumina particles in the resin tends to be further improved. When the alumina powder includes the second alumina particle having an average sphericity of 0.98 or less, the fluidity of the alumina particles in the resin is prevented from being excessively improved, and an excessive reduction in viscosity when the resin is filled with the alumina powder tends to be able to be suppressed.

Figure 1:
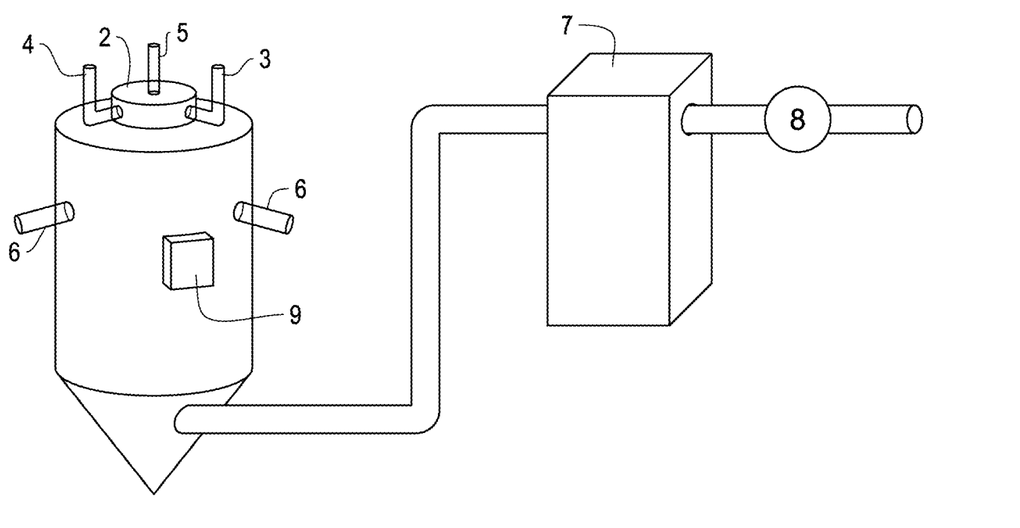
FIG. 1 is a schematic view showing a flame melting apparatus used in producing the second alumina particle and the third alumina particle according to the present embodiment.

The second alumina particle according to the present embodiment can be obtained as follows. How to obtain the same will be outlined using the flame melting apparatus of FIG. 1. A raw material is injected from a raw material powder supply pipe 5 into a flame, and the raw material is melted in a melting furnace 1. Dry ice is constantly supplied to the melting furnace 1 from a cooling medium supply port 6 to carry out quenching treatment. The cooling effect of the quenching treatment is confirmed by measuring the temperature in the melting furnace 1 before the supply of dry ice and after the supply of dry ice. An R thermocouple 9 is used for the temperature measurement, and the R thermocouple 9 is usually inserted up to the furnace wall surface at a height of 100 cm from the top of the melting furnace 1. The obtained spheroid is conveyed to a bag filter 7 by a blower 8 together with the exhaust gas and collected. The flame is formed by injecting a fuel gas such as hydrogen, natural gas, acetylene gas, propane gas, and butane from a fuel gas supply pipe 4, and a supporting gas such as air and oxygen from a supporting gas supply pipe 3 from a burner 2 disposed in the melting furnace 1. As a carrier gas for raw material powder supply, air, nitrogen, oxygen, carbon dioxide, and the like can be used. Hereinafter, the method for producing the second alumina particle according to the present embodiment will be described in detail.

Examples of the raw material used for obtaining the second alumina particle include an aluminum hydroxide powder or a slurry thereof, and an alumina powder or a slurry thereof, and among these, an alumina powder or a slurry thereof is preferably used because it has generally the α crystal phase as the main crystal phase. The particle diameter of the alumina particle obtained can be adjusted according to the particle diameter of the particle used as the raw material. Specifically, if the particle diameter of the particle used as the raw material is increased, the particle diameter of the alumina particle also increases, and if the particle diameter of the particle used as the raw material is decreased, the particle diameter of the alumina particle also decreases.

In the present embodiment, when an alumina powder is used as the raw material of the second alumina particle, the slurry concentration of the alumina powder is preferably 10% by mass or more and 70% by mass or less. When the slurry concentration is 10% by mass or more, the productivity further improves, and when the slurry concentration is 70% by mass or less, an increase in slurry viscosity can be suppressed, and transportation and spraying tend to be easy. Water is preferable as a solvent for dispersing the alumina powder in the slurry from the viewpoints of dispersibility, safety, and economy. However, the solvent may be a flammable liquid such as alcohol or a mixed liquid such as water-alcohol as long as the alumina powder as the raw material can be dispersed. For the preparation of the slurry, predetermined amounts of the solvent and the raw material powder may be placed in a container for preparation and mixed using a stirrer or the like until the raw material powder is sufficiently dispersed, and no special preparation method is required.

A thermal spraying method is usually used in order to spheroidize the alumina powder. An advantage of the thermal spraying method is that spheroidization is easy. The alumina powder can also be dispersed in a solvent to be brought into a slurry state to spray and supply the alumina powder in the slurry state into a flame in the form of a fine mist. As a spraying method, a spray nozzle as used in a spray dryer can be utilized, spraying using a feed tube having a strong dispersion function is preferable, and a two-fluid nozzle is preferable for spraying a wet slurry using a solvent.

In addition, instead of the wet slurry, a dry feed method involving dispersing an alumina powder in a gas such as oxygen and air can also be used. In this case, it is important to sufficiently disperse the alumina powder by a feed method having a strong dispersion function, and for example, it is preferable to do so by a ring nozzle method that utilizes dispersion by a shear force due to a high-speed air flow using a feed tube section in the shape of an ejector nozzle.

In order to form a flame, a fuel gas such as hydrogen, natural gas, acetylene gas, propane gas, and butane and a supporting gas such as air and oxygen may be injected from a nozzle and burned. The flame temperature is preferably held at 2050° C. or more and 2300° C. or less. If the flame temperature is higher than 2300° C., it becomes difficult to obtain the quenching effect, and if the flame temperature is lower than 2050° C., it becomes difficult to realize a high sphericity. The flame temperature can be controlled, for example, by changing the flow rate of the fuel gas, and thereby alumina powders having different sphericities can be prepared. The higher the temperature, the higher the sphericity, and the longer the time, the higher the sphericity.

The alumina powder injected into the flame undergoes high temperature heat treatment and thereby the alumina powder is spheroidized. At this time, the content ratio of the α crystal phase can be adjusted by quenching treatment using dry ice. Specifically, when the amount of dry ice introduced into the furnace, which is a quenching condition, is changed to a high value, the content ratio of the α crystal phase tends to decrease.

The heat-treated powder is sucked together with the exhaust gas by a blower or the like, and is collected by a collector of a cyclone or a bag filter. The collection temperature at this time is preferably 500° C. or more. A collection temperature of 500° C. or more is preferable because by setting the collection temperature to 500° C. or more, it is possible to suppress the adhesion of the Na component gasified by thermal spraying to the collected powder and the precipitation thereof, and as a result, Na is easy to remove. However, because of the material of the collector, the upper limit of the collection temperature is preferably about 1100° C. In addition, by setting the collection temperature to 500° C. or more, it is possible to suppress the mixing of another cation impurity or an anion impurity in a large amount and to make the neutrality of the alumina powder more sufficient.

In addition, it is preferable to remove an ionic impurity such as a cation or an anion from the obtained alumina powder by using ion exchanged water or the like.

(Third Alumina Particle and Method for Producing the Same)

The third alumina particle according to the present embodiment has an average particle diameter of 10 μm or more and 100 μm or less. The third alumina particle contributes most to the thermal conductivity in the alumina powder according to the present embodiment, and is blended in order to improve the resin fillability. The average particle diameter of the third alumina particle is preferably 15 μm or more and 90 μm or less, and more preferably 20 μm or more and 80 μm or less from the viewpoint of the high thermal conductivity and the resin fillability.

In the third alumina particle of the present embodiment, the average sphericity of the third alumina particle having a projected area equivalent circle diameter in a predetermined range as determined in the same manner as above except that the "predetermined range" is more than 10 μm and 100 μm or less is preferably 0.80 or more and 0.98 or less, and more preferably 0.85 or more and 0.97 or less. When the alumina powder includes the third alumina particle having an average sphericity of 0.80 or more, the resin fillability tend to be further improved. When the alumina powder includes the third alumina particle having an average sphericity of 0.98 or less, an excessive reduction in viscosity during resin filling tends to be able to be suppressed.

The third alumina particle according to the present embodiment can be obtained, for example, by the same production method as in the second alumina particle described above.

(Content of Each of First Alumina Particle, Second Alumina Particle, and Third Alumina Particle)

In the present embodiment, the content of the first alumina particle is preferably 2.0 parts by mass or more and 20.0 parts by mass or less, more preferably 4.0 parts by mass or more and 18.0 parts by mass or less, and even more preferably 5.0 parts by mass or more and 16.0 parts by mass or less from the viewpoint of further improving the fluidity during resin filling. In addition, the content of the second alumina particle is preferably 3.0 parts by mass or more and 50.0 parts by mass or less, more preferably 5.0 parts by mass or more and 45.0 parts by mass or less, and even more preferably 10.0 parts by mass or more and 40.0 parts by mass or less. Further, the content of the third alumina particle is preferably 30.0 parts by mass or more and 95.0 parts by mass or less, more preferably 35.0 parts by mass or more and 90.0 parts by mass or less, and even more preferably 40.0 parts by mass or more and 85.0 parts by mass or less. The total content of the first alumina particle, the second alumina particle, and the third alumina particle is 100 parts by mass.

When the first alumina particle, the second alumina particle, and the third alumina particle are each included at the above content, these alumina particles can be densely arranged in the resin in such a way as to fill a gap, and thus the resin can be filled with the alumina powder in a high proportion. Because of this, the alumina particles can come into contact with each other at many points and surfaces, it becomes easy to form a heat path, and high thermal conductivity can be realized. In addition, because these alumina particles can be densely arranged in the resin in such a way as to fill a gap, the alumina powder has good fluidity in the resin. As a result, an increase in viscosity when the resin is filled with the alumina powder can be suppressed.

In the present embodiment, the content of each alumina particle is measured by classifying the alumina powder into each alumina particle, for example, by the method described in the Examples.

(Average Sphericity of Alumina Powder)

In the alumina powder of the present embodiment, the average sphericity of the alumina particles having a projected area equivalent circle diameter in a predetermined range as determined in the same manner as above except that the "predetermined range" is 0.1 μm or more and 10 μm or less is preferably 0.80 or more because the fluidity when the resin is filled therewith is further improved. In addition, the upper limit is preferably 0.98 or less because an excessive improvement in fluidity when the resin is filled therewith can be suppressed.

The average sphericity of the alumina particles having a projected area equivalent circle diameter in a predetermined range as determined in the same manner as above except that the "predetermined range" is more than 10 μm and 100 μm or less is preferably 0.80 or more because the fluidity when the resin is filled therewith is further improved. In addition, the upper limit is preferably 0.98 or less because an excessive improvement in fluidity when the resin is filled therewith can be suppressed.

(Content Ratio of α Crystal Phase in Alumina Powder)

The content ratio of the α crystal phase in the alumina powder according to the present embodiment is preferably 60% by mass or more from the viewpoint of obtaining a resin composition and a heat dissipation material having higher thermal conductivity. The upper limit is, for example, 100% by mass. The content ratio of the α crystal phase is measured by an X-ray diffraction method. A specific measurement method is as described in the Examples.

(Total Content Ratio of First Alumina Particle, Second Alumina Particle, and Third Alumina Particle in Alumina Powder)

In the present embodiment, the total content ratio of the first alumina particle, the second alumina particle, and the third alumina particle in the alumina powder is preferably 85% by mass or more and 100% by mass or less. The content ratio of a component other than the first alumina particle, the second alumina particle, and the third alumina particle is usually 15% by mass or less, preferably 10% by mass or less, and more preferably 7% by mass or less. Examples of the component other than the first alumina particle, the second alumina particle, and the third alumina particle include an alumina particle having an average particle diameter of less than 0.1 μm, an alumina particle having an average particle diameter of more than 100 μm, a filler other than the alumina particles, an additive other than the filler, and an impurity.

(Method for Producing Alumina Powder)

In the method for producing the alumina powder according to the present embodiment, it is preferable to obtain the alumina powder by mixing the first alumina particle in an amount of 2.0% by mass or more and 20.0% by mass or less, the second alumina particle in an amount of 3.0% by mass or more and 50.0% by mass or less, and the third alumina particle in an amount of 30.0% by mass or more and 95.0% by mass or less. As a mixing method, a known method can be adopted and is not particularly limited.

[Resin Composition and Method for Producing the Same]

The resin composition according to the present embodiment includes at least a resin and the alumina powder according to the present embodiment. By including the above alumina powder, the resin composition according to the present embodiment can suppress thickening and have high thermal conductivity.

(Resin)

As the resin, various polymer compounds such as a thermoplastic resin and an oligomer thereof and an elastomer can be used, and for example, an epoxy resin, a phenol resin, a melamine resin, a urea resin, an unsaturated polyester, a urethane resin, an acrylic resin, and a fluororesin; a polyamide such as polyimide, polyamideimide, and polyetherimide; a polyester such as polybutylene terephthalate and polyethylene terephthalate; polyphenylene sulfide, aromatic polyester, polysulfone, a liquid crystal polymer, polyether sulfone, a polycarbonate, a maleimide modified resin, ABS (acrylonitrile/butadiene/styrene) resin, AAS (acrylonitrile/acrylic rubber/styrene) resin, AES (acrylonitrile/ethylene/propylene/diene rubber/styrene) resin, EVA (ethylene vinyl acetate copolymer) resin, and a silicone resin can be used. One of these resins can be used alone or two or more thereof can be appropriately mixed and used.

Among these resins, from the viewpoint of heat resistant temperature, strength, and hardness after curing, an epoxy resin, a phenol resin, a urethane resin, an acrylic resin, a fluororesin, polyimide, polyphenylene sulfide, a polycarbonate, ABS resin, and a silicone resin are preferable, a silicone resin, an epoxy resin, a urethane resin, and an acrylic resin are more preferable, and a silicone resin is even more preferable.

As the silicone resin, it is preferable to use a rubber or gel obtained from a one-component or two-component addition reaction type liquid silicone having an organic group such as a methyl group and a phenyl group. Examples of such a rubber or gel include "YE5822A Liquid/YE5822B Liquid" manufactured by Momentive Performance Materials Japan LLC and "SE1885A liquid/SE1885B liquid" manufactured by Dow Corning Toray Co., Ltd.

(Content of Each of Alumina Powder and Resin)

In the resin composition of the present embodiment, the content of the alumina powder according to the present embodiment is preferably 65% by mass or more and 95% by mass or less based on the total amount of the resin composition from the viewpoint of developing a characteristic of the filler used for filling. The alumina powder according to the present embodiment does not easily thicken even when the resin is filled therewith, and thus even if the alumina powder is included in the resin composition within the above range, the thickening of the resin composition can be suppressed. In addition, when the content of the alumina powder is less than 65% by mass, it tends to be difficult to obtain a resin composition and a heat dissipation component that can realize good high thermal conductivity, and when the content of the alumina powder exceeds 95% by mass, the amount of the resin to bind the alumina powder is small, and thus it becomes difficult to apply the resin composition to a heat dissipation component.

In the resin composition of the present embodiment, the content of the resin according to the present embodiment is preferably 5% by mass or more and 35% by mass or less based on the total amount of the resin composition from the viewpoint of developing a characteristic of the filler used for filling.

(Other Components)

In addition to the alumina powder and the resin according to the present embodiment, the resin composition of the present embodiment may include, as necessary, an inorganic filler such as fused silica, crystalline silica, zircon, calcium silicate, calcium carbonate, silicon carbide, aluminum nitride, boron nitride, beryllia, and zirconia; a flame retardant compound such as a nitrogen-containing compound such as melamine and benzoguanamine, an oxazine ring-containing compound, and a phosphate compound of a phosphorus-based compound, an aromatic condensed phosphoric acid ester, and a halogen-containing condensed phosphoric acid ester; an additive, or the like, as long as a characteristic of the present embodiment is not impaired. Examples of the additive include a reaction retarder such as dimethyl maleate, a curing agent, a curing accelerator, a flame retardant aid, a flame retardant, a colorant, a tackifier, a UV absorber, an antioxidant, a fluorescent whitener, a photosensitizer, a thickener, a lubricant, an antifoamer, a surface conditioner, a brightener, and a polymerization inhibitor. One of these components can be used alone or two or more thereof can be appropriately mixed and used. In the resin composition of the present embodiment, the content ratio of each of other components is usually 0.1% by mass or more and 30% by mass or less.

(Method for Producing Resin Composition)

Examples of a method for producing the resin composition of the present embodiment include a method involving sufficiently stirring the resin, the alumina powder, and, as necessary, another component to obtain the resin composition. The resin composition of the present embodiment can be produced, for example, by blending a predetermined amount of each component using a blender, a Henschel mixer, or the like, then kneading the resulting blend using a heating roll, a kneader, a single screw or twin screw extruder, or the like, cooling the kneaded product, and then pulverizing the same.

[Heat Dissipation Component]

The heat dissipation component according to the present embodiment includes the alumina powder or the resin composition according to the present embodiment. By using the above alumina powder or resin composition, the heat dissipation component according to the present embodiment can realize high thermal conductivity, that is, can have high heat dissipation properties. The content ratio of the alumina powder in the heat dissipation component according to the present embodiment is preferably 30% by volume or more and 85% by volume or less from the viewpoint of being able to realize higher thermal conductivity. Examples of the heat dissipation component include a heat dissipation sheet, a heat dissipation grease, a heat dissipation spacer, a semiconductor encapsulant, and a heat dissipation coating material (heat dissipation coating agent).

EXAMPLES

Examples and Comparative Examples are shown below, and the present invention will be described in detail, but the present invention is not limited to these Examples at all.

[Method for Classifying Each Alumina Particle from Alumina Powder]

The first alumina particle, the second alumina particle, and the third alumina particle can be obtained by classification from an alumina powder by the following method.

First, 4 L of ion exchanged water and 1 kg of an alumina powder were placed in a beaker (5 L) equipped with a polypropylene handle manufactured by SANPLATEC Corporation, and mixed at 600 rpm for 10 minutes using stirrer Three-One Motor BL3000 (trade name) manufactured by Shinto Scientific Co., Ltd. After that, the stirrer was stopped and the mixture was allowed to stand for 6 hours, then a slurry for 15 cm from the water surface of the plastic container was extracted using peristaltic roller pump RP-1000 (trade name, tube diameter of 4.8 mmφ manufactured by Tokyo Rikakikai Co., Ltd., the extracted slurry was transferred to a SUS vat, and then dried at 120° C. for 72 hours in dryer CLEAN OVEN DE-61 (trade name) manufactured by Yamato Scientific Co., Ltd. to take out the resulting alumina particle, and the alumina particle was used as the first alumina particle. After that, 3.5 L of ion exchanged water was added to the original slurry and mixed at 600 rpm for 10 minutes. After that, the stirrer was stopped and the mixture was allowed to stand for 15 minutes, then a slurry for 15 cm from the water surface of the plastic container was extracted in the same manner as before, dried at 120° C. for 72 hours, the resulting alumina particle was taken out, and the particle was used as the second alumina particle. In addition, the residue of this slurry was also dried by the same method, the resulting alumina particle was taken out, and the particle was used as the third alumina particle. Of these operations, the operations from mixing using a stirrer to extraction of a slurry were each carried out by making an adjustment such that the liquid temperature was 20° C.

In the following evaluation, when an alumina powder including the first alumina particle, the second alumina particle, and the third alumina particle was used, the evaluation of each particle was carried out by classification by this method.

[Evaluation Methods]

(1) Average Particle Diameter and Particle Size Distribution of Alumina Particle The average particle diameter and the particle size distribution of an alumina particle were measured using laser light diffraction scattering particle size distribution analyzer LS-230 (trade name) manufactured by Beckman Coulter, Inc. At the time of measurement, 0.04 g of each of the alumina particles obtained in the Examples and the Comparative Examples to be measured was added to a mixed solution of 0.5 mL of ethanol and 5 mL of ion exchanged water as a solvent, and the resulting mixture was subjected to a pretreatment for 2 minutes and dispersion treatment for 30 seconds using Ultrasonic Disruptor UD-200 (equipped with Special Micro Chip TP-030) (trade name) manufactured by TOMY SEIKO Co., Ltd. to obtain a slurry. Using this slurry, the particle size distribution was measured at a pump rotation speed of 60 rpm. In the analysis of the particle size distribution, 1.333 and 1.768 were used as the refractive indexes of water and the alumina particle, respectively. The analysis of the particle size distribution was carried out in parts by volume—cumulative. In the measured mass-based particle size distribution, the particle at a cumulative mass of 50% was taken as the average particle diameter (μm).

(2) Average Sphericity

As described in the above microscopy, a particle image taken using a scanning electron microscope (SEM) (Model JSM-6301F (trade name) manufactured by JEOL Ltd.) was taken into an image analyzer ("MacView" (trade name) manufactured by Mountech Co., Ltd.), and the projected area (A) and the perimeter (PM) of each of the alumina particles (the projected area equivalent circle diameter as determined by microscopy was 0.1 μm or more and 100 μm or less) obtained in the Examples and the Comparative Examples were measured from the photograph for 200 particles arbitrarily selected. These values were used to determine the sphericities of the individual particles and the proportions thereof, and the arithmetic mean value of the sphericities of the individual particles was taken as the average sphericity. By this method, the average sphericities of the first alumina particle having a projected area equivalent circle diameter of 0.1 μm or more and 1 μm or less, the second alumina particle having a projected area equivalent circle diameter of more than 1 μm and 10 μm or less, and the third alumina particle having a projected area equivalent circle diameter of more than 10 μm and 100 μm or less were measured. In addition, the average sphericity of an alumina particle having a projected area equivalent circle diameter of 0.1 μm or more and 10 μm or less, and the average sphericity of an alumina particle having a projected area equivalent circle diameter of more than 10 μm and 100 μm or less were also measured by analysis for each particle diameter after measurement in the same manner as above.

(3) Specific Surface Area

The specific surface area is a value based on the BET method, and specific surface area measuring instrument "Macsorb HM model-1208 (trade name)" manufactured by Mountech Co., Ltd. was used and 1.0 g of each sample of the alumina particles obtained in the Examples and the Comparative Examples was used to carry out measurement by the BET one-point method to determine the specific surface area ($m^2/g$). Prior to the measurement, each of the alumina particles obtained in the Examples and the Comparative Examples was heated at 300° C. and for 18 minutes in a nitrogen gas atmosphere as a pretreatment. In addition, in the BET measurement, a mixed gas of 30% nitrogen and 70% helium was used as an adsorption gas, and the flow rate was adjusted such that the indicated value of the main body flowmeter was 25 ml/min.

(4) Content Ratio of α Crystal Phase in First Alumina Particle and Content Ratio of α Crystal Phase in Alumina Powder The content ratio of the α crystal phase in the alumina particle and the content ratio of the α crystal phase in the alumina powder were measured by the following method.

NIST-676a (α-alumina), which is an intensity standard substance for X-ray diffraction (XRD), and θ, δ, and γ-alumina were used, each alumina was weighed in such a way as to reach a total of 2 g, and then mixed for 15 minutes using a grinding machine to prepare a sample for creating a calibration curve. After that, for each sample, a sealed tube type X-ray diffractometer (D8 ADVANCE (trade name) manufactured by Bruker Corporation) was used to calculate the integrated intensity (Cps×deg) under the following measurement conditions to create a calibration curve. For the measurement of the content ratio of the α crystal phase, three diffraction peaks in α-alumina (2θ=25.6° (012), 35.2° (104), and 2θ=43.4° (113) were used.

(Measurement Conditions)

θ/θ scan, tube voltage: 40 kV, tube current: 40 mA, X-ray source: CuKα ($\lambda$=1.54056 Å), slit: DS, 0.5°, solar slit: 2.5 deg.

Subsequently, each of the alumina particles obtained in the Examples and the Comparative Examples was used to measure the diffraction peak area (Y) of the (113) plane derived from the αcrystal phase of alumina, and the above calibration curve was used to calculate the content ratio (% by mass) of the αcrystal phase. For the measurement, a diffraction peak detected at 2θ=10° or more and 70° or less was used. In addition, each of the alumina powders obtained in the Examples and the Comparative Examples was used to measure the diffraction peak area (Y) of the (113) plane derived from the αcrystal phase of alumina, and the above calibration curve was used to calculate the content ratio (% by mass) of the αcrystal phase. For the measurement, a diffraction peak detected at 2θ=10° or more and 70° or less was used.

(5) Viscosity

Each of the alumina powders obtained in the Examples and the Comparative Examples left to stand for one day (filling ratio of alumina powder: 87.9% by mass) was placed in a silicone rubber A liquid (vinyl group-containing polymethylsiloxane, YE5822A Liquid (trade name) manufactured by Momentive Performance Materials Japan LLC) and mixed using a stirrer (NZ-1100 (trade name) manufactured by Tokyo Rikakikai Co., Ltd.), and vacuum defoamed to obtain a composition. The obtained composition was subjected to viscosity measurement (Pa·s) using a Brookfield type viscometer model (TVB-10 (trade name) manufactured by Toki Sangyo Co., Ltd.). The viscosity was measured using a No. 7 spindle at a rotation speed of 20 rpm and a room temperature of 20° C.

(6) Thermal Conductivity

Each of the alumina powders obtained in the Examples and the Comparative Examples, a reaction retarder (dimethyl maleate, manufactured by Kanto Chemical Co., Inc.), and a silicone rubber B liquid (including YE5822B Liquid (trade name) manufactured by Momentive Performance Materials Japan LLC, a crosslinking agent, and the like) were sequentially placed in a silicone rubber A liquid (vinyl group-containing polymethylsiloxane, YE5822A Liquid (trade name) manufactured by Momentive Performance Materials Japan LLC), stirred, and then subjected to defoaming treatment to obtain a sample in the form of a slurry. The blending ratio thereof was calculated by adding each of the alumina powders obtained in the Examples and the Comparative Examples in the maximum amount of filling allowing hot forming, to a liquid obtained by adding 0.01 parts by mass of a reaction retarder to 100 parts by mass of a silicone rubber mixed liquid obtained by mixing 10 parts by volume of the silicone rubber A liquid with 1 part by volume of the silicone rubber B liquid, and was the proportion shown in Table 1.

TABLE 1

| Sample | Blending proportion (% by mass) |
|---|---|
| Silicone rubber A liquid | 11.0 |
| Silicone rubber B liquid | 1.1 |
| Alumina powder | 87.9 |
| Reaction retarder | (Mass of silicone rubber A liquid + mass of silicone rubber B liquid) × 0.01 parts by mass |

After that, the obtained sample in the form of a slurry was poured into a mold provided with a recess having a diameter of 28 mm and a thickness of 3 mm, degassed, and then hot formed at 150° C. for 20 minutes. The obtained formed article was sandwiched between a copper heater case of 15 mm×15 mm and a copper plate, and set at a tightening torque of 5 kgf-cm. After that, an electric power of 15 W was applied to the copper heater case and held for 4 minutes, the temperature difference between the copper heater case and the copper plate was measured, and the thermal resistance was calculated by the following expression.

Thermal resistance (° C./$W$)=temperature difference between copper heater case and copper plate (° C.)/heater electric power ($W$)

Next, the thermal resistance (° C./W), the heat transfer area [copper heater case area](m$^2$), and the formed body thickness (m) in the case of a tightening torque of 5 kgf-cm were used to calculate the thermal conductivity from the following expression. That is, the thermal conductivity is a value at the time of filling with each of the alumina powders obtained in the Examples and the Comparative Examples in the maximum amount of filling allowing hot forming. As a thermal conductivity measuring instrument, model ARC-TC-1 (trade name) manufactured by AGNE Gijutsu Center Inc., was used.

Thermal conductivity ($W$/m·K)=formed body thickness (m)/{heat resistance (° C./$W$)×heat transfer area (m$^2$)}

[Alumina Particles]

(1) First Alumina Particles

The following alumina particles were each used as a raw material for the first alumina particle. The average sphericity is a value of a particle having a projected area equivalent circle diameter of 0.1 μm or more and 1 μm or less.

(1-1) Advanced Alumina AA-03 manufactured by Sumitomo Chemical Co., Ltd. (trade name, average particle diameter: 0.3 μm, average sphericity: 0.83, specific surface area: 5.2 m$^2$/g, αcrystal phase content ratio: 99% by mass)

(1-2) Advanced Alumina AA-05 manufactured by Sumitomo Chemical Co., Ltd. (trade name, average particle diameter: 0.5 μm, average sphericity: 0.86, specific surface area: 3.0 m$^2$/g, αcrystal phase content ratio: 99, by mass)

(1-3) Advanced Alumina AA-07 manufactured by Sumitomo Chemical Co., Ltd. (trade name, average particle diameter: 0.7 μm, average sphericity: 0.87, specific surface area: 2.2 m$^2$/g, αcrystal phase content ratio: 99% by mass)

(1-4) Advanced Alumina AA-1.5 manufactured by Sumitomo Chemical Co., Ltd. (trade name, average particle diameter: 1.5 μm, average sphericity: 0.85, specific surface area: 1.0 m$^2$/g, αcrystal phase content ratio: 99% by mass)

(1-5) Advanced Alumina AA-3 manufactured by Sumitomo Chemical Co., Ltd. (trade name, average particle diameter: 3.0 μm, average sphericity: 0.84, specific surface area: 0.5 m$^2$/g, αcrystal phase content ratio: 99% by mass)

(1-6) Alumina particle A (average particle diameter: 0.05 m, average sphericity: 0.94, specific surface area: 40.1 m$^2$/g, αcrystal phase content ratio: 1% by mass)

(1-7) Alumina particle B (average particle diameter: 0.1 μm, average sphericity: 0.91, specific surface area: 19.7 m/g, αcrystal phase content ratio: 81% by mass)

(1-8) Alumina particle C (average particle diameter: 0.3 μm, average sphericity: 0.92, specific surface area: 10.0 m$^2$/g, αcrystal phase content ratio: 1% by mass)

(1-9) Alumina particle D (average particle diameter: 0.5 μm, average sphericity: 0.98, specific surface area: 6.0 m$^2$/g, αcrystal phase content ratio: 1% by mass)

(1-10) Alumina particle E (average particle diameter: 0.5 μm, average sphericity: 0.99, specific surface area: 5.8 m/g, αcrystal phase content ratio: 97% by mass)

(1-11) Alumina particle F (average particle diameter: 0.7 µm, average sphericity: 0.92, specific surface area: 2.8 m²/g, αcrystal phase content ratio: 93% by mass)

(1-12) Alumina particle G (average particle diameter: 0.5 µm, average sphericity: 0.76, specific surface area: 6.0 m²/g, αcrystal phase content ratio: 97' by mass)

Alumina particles A to F were appropriately produced by the method described in International Publication No. WO 2008/053536 or the like. Alumina particle G was produced by the method described later.

The first alumina particle was used after appropriately mixing the above alumina particles and adjusting the average particle diameter, the sphericity, and the like in such a way as to be within the ranges shown in Tables 2 and 3.

(2) Alumina Particle G, Second Alumina Particle, and Third Alumina Particle

Alumina LS-21 (trade name, average particle diameter: 55 µm) manufactured by Nippon Light Metal Co., Ltd. as a raw material was melted, cooled, and pulverized in an arc furnace to prepare a pulverized fused alumina product. The pulverization treatment was carried out using a ball mill, and an alumina ball was used as a pulverization medium.

Alumina particle G, alumina raw material 1 (average particle diameter: 2 µm), alumina raw material 2 (average particle diameter: 5 µm), alumina raw material 3 (average particle diameter: 10 µm), alumina raw material 4 (average particle diameter: 20 m), alumina raw material 5 (average particle diameter: 50 m), and alumina raw material 6 (average particle diameter: 80 µm) were prepared from the obtained pulverized alumina product by classification treatment.

The obtained alumina raw materials 1 to 6 were appropriately used as alumina raw materials for producing the second alumina particle or the third alumina particle.

Example 1

The first alumina particle was produced by mixing 80 parts by mass of (1-1) alumina particle (Advanced Alumina AA-03 (trade name) manufactured by Sumitomo Chemical Co., Ltd.) and 20 parts by mass of (1-8) alumina particle C using intensive mixer EL-1 (trade name) manufactured by Nippon Eirich Co., Ltd.

The second alumina particle was produced by the following method. That is, using the production apparatus shown in FIG. 1, alumina raw material 1 was entrained in oxygen gas (gas flow rate: 50 Nm³/hour) and supplied into a flame from a spray nozzle, and was subjected to flame melting treatment while constantly supplying a fuel gas (LP gas, gas flow rate: 10 Nm³/hour) into a production furnace. At the time of this flame melting treatment, in order to control the content ratio of the αcrystal phase in the alumina powder, dry ice was appropriately supplied into the furnace to carry out cooling treatment.

In addition, the third alumina particle was produced by the following method. That is, using the production apparatus shown in FIG. 1, alumina raw material 4 was entrained in oxygen gas (gas flow rate: 75 Nm³/hour) and supplied into a flame from a spray nozzle, and was subjected to flame melting treatment while constantly supplying a fuel gas (LP gas, gas flow rate: 15 Nm³/hour) into a production furnace. At the time of this flame melting treatment, in order to control the content ratio of the αcrystal phase in the alumina powder, dry ice was appropriately supplied into the furnace to carry out cooling treatment.

The physical properties of each of the first alumina particle, the second alumina particle, and the third alumina particle obtained were evaluated, and results thereof are shown in Table 2.

After that, 3.0 parts by mass of the first alumina particle obtained, 37.0 parts by mass of the second alumina particle obtained, and 60.0 parts by mass of the third alumina particle obtained were mixed using intensive mixer EL-1 (trade name) manufactured by Nippon Eirich Co., Ltd. to produce alumina powder 1.

Evaluation results using alumina powder 1 obtained are shown in Table 2.

Examples 2 to 12

As the first alumina particle, the first alumina particles having the physical properties shown in Table 2 were each produced in the same manner as in Example 1.

In addition, the second alumina particles having the physical properties shown in Table 2 were obtained in the same manner as in Example 1 except that the types of alumina raw materials (raw materials 1 to 6), the flow rate of oxygen gas, and the flow rate of the fuel gas were changed according to Table 2.

Further, the third alumina particles having the physical properties shown in Table 2 were obtained in the same manner as in Example 1 except that the types of alumina raw materials (raw materials 1 to 6), the flow rate of oxygen gas, and the flow rate of the fuel gas were changed according to Table 2.

The first alumina particles, the second alumina particles, and the third alumina particles thus obtained were mixed according to the amounts blended shown in Table 2 using intensive mixer EL-1 (trade name) manufactured by Nippon Eirich Co., Ltd. to produce alumina powders 2 to 12, respectively.

Evaluation results using alumina powders 2 to 12 are shown in Table 2 along with the physical properties of each of the first alumina particles, the second alumina particles, and the third alumina particles obtained.

Comparative Example 1

The first alumina particle was produced by mixing 15 parts by mass of (1-6) alumina particle A and 85 parts by mass of (1-7) alumina particle B using intensive mixer EL-1 (trade name) manufactured by Nippon Eirich Co., Ltd.

The second alumina particle was produced by the following method. That is, using the production apparatus shown in FIG. 1, alumina raw material 1 was entrained in oxygen gas (gas flow rate: 15 Nm³/hour) and supplied into a flame from a spray nozzle, and was subjected to flame melting treatment while constantly supplying a fuel gas (LP gas, gas flow rate: 3 Nm³/hour) into a production furnace. At the time of this flame melting treatment, in order to control the content ratio of the αcrystal phase in the alumina powder, dry ice was appropriately supplied into the furnace to carry out cooling treatment.

In addition, the third alumina particle was produced by the following method. That is, using the production apparatus shown in FIG. 1, alumina raw material 3 was entrained in oxygen gas (gas flow rate: 15 Nm³/hour) and supplied into a flame from a spray nozzle, and was subjected to flame melting treatment while constantly supplying a fuel gas (LP gas, gas flow rate: 3 Nm³/hour) into a production furnace. At the time of this flame melting treatment, in order to control the content ratio of the αcrystal phase in the alumina powder, dry ice was appropriately supplied into the furnace to carry out cooling treatment.

The physical properties of each of the first alumina particle, the second alumina particle, and the third alumina particle obtained were evaluated, and results thereof are shown in Table 3.

After that, 5.3 parts by mass of the first alumina particle obtained, 47.0 parts by mass of the second alumina particle obtained, and 47.7 parts by mass of the third alumina particle obtained were mixed using intensive mixer EL-1 (trade name) manufactured by Nippon Eirich Co., Ltd. to produce alumina powder a.

Evaluation results using alumina powder a obtained are shown in Table 3.

Comparative Examples 2 to 11

As the first alumina particle, the first alumina particles having the physical properties shown in Table 3 were each produced in the same manner as in Example 1.

In addition, the second alumina particles having the physical properties shown in Table 3 were obtained in the same manner as in Example 1 except that the types of alumina raw materials (raw materials 1 to 6), the flow rate of oxygen gas, and the flow rate of the fuel gas were changed according to Table 3.

Further, the third alumina particles having the physical properties shown in Table 3 were obtained in the same manner as in Example 1 except that the types of alumina raw materials (raw materials 1 to 6), the flow rate of oxygen gas, and the flow rate of the fuel gas were changed according to Table 3.

The first alumina particles, the second alumina particles, and the third alumina particles thus obtained were mixed according to the amounts blended shown in Table 3 using intensive mixer EL-1 (trade name) manufactured by Nippon Eirich Co., Ltd. to produce alumina powders b to k, respectively.

Evaluation results using alumina powders b to k are shown in Table 3 along with the physical properties of each of the first alumina particles, the second alumina particles, and the third alumina particles obtained.

|  |  | Example 1 | Example 2 | Example 3 | Example 4 | Example 5 | Example 6 |
|---|---|---|---|---|---|---|---|
|  | Alumina powder | 1 | 2 | 3 | 4 | 5 | 6 |
| First alumina particle | Average particle diameter (μm) | 0.1 | 0.9 | 0.9 | 0.1 | 0.3 | 0.5 |
|  | Average sphericity | 0.91 | 0.88 | 0.87 | 0.91 | 0.85 | 0.97 |
|  | Specific surface area (m²/g) | 19.0 | 2.0 | 1.9 | 20.0 | 6.0 | 5.4 |
|  | Content ratio of α crystal phase (% by mass) | 82 | 97 | 99 | 79 | 80 | 94 |
|  | Content (parts by mass) | 3.0 | 10.0 | 8.0 | 7.0 | 9.0 | 5.0 |
| Second alumina particle | Alumina raw material | 1 | 2 | 2 | 1 | 2 | 1 |
|  | Oxygen gas supply rate (Nm³/hour) | 50 | 25 | 35 | 25 | 25 | 50 |
|  | Fuel gas (LPG) supply rate (Nm³/hour) | 10 | 5 | 7 | 5 | 5 | 10 |
|  | Average particle diameter (μm) | 2.0 | 7.9 | 8.9 | 3.0 | 5.0 | 1.0 |
|  | Average sphericity | 0.97 | 0.88 | 0.93 | 0.85 | 0.83 | 0.99 |
|  | Content (parts by mass) | 37.0 | 35.0 | 29.0 | 28.0 | 30.0 | 40.0 |
| Third alumina particle | Alumina raw material | 4 | 6 | 6 | 4 | 5 | 3 |
|  | Oxygen gas supply rate (Nm³/hour) | 75 | 100 | 85 | 50 | 75 | 50 |
|  | Fuel gas (LPG) supply rate (Nm³/hour) | 15 | 20 | 17 | 10 | 15 | 10 |
|  | Average particle diameter (μm) | 20.2 | 81.0 | 91.0 | 18.0 | 48.0 | 11.0 |
|  | Average sphericity | 0.93 | 0.94 | 0.91 | 0.89 | 0.93 | 0.89 |
|  | Content (parts by mass) | 60.0 | 55.0 | 63.0 | 65.0 | 61.0 | 55.0 |
| Content ratio of α crystal phase in alumina powder (% by mass) |  | 68 | 60 | 65 | 70 | 63 | 61 |
| Viscosity (Pa · s) |  | 76 | 83 | 79 | 79 | 76 | 73 |
| Thermal conductivity (W/mK) |  | 4.0 | 5.3 | 5.5 | 4.2 | 4.1 | 4.2 |

|  |  | Example 7 | Example 8 | Example 9 | Example 10 | Example 11 | Example 12 |
|---|---|---|---|---|---|---|---|
|  | Alumina powder | 7 | 8 | 9 | 10 | 11 | 16 |
| First alumina particle | Average particle diameter (μm) | 0.5 | 0.3 | 0.7 | 0.5 | 0.5 | 0.5 |
|  | Average sphericity | 0.89 | 0.83 | 0.87 | 0.98 | 0.80 | 0.87 |
|  | Specific surface area (m²/g) | 3.4 | 5.3 | 2.2 | 5.7 | 5.0 | 3.0 |
|  | Content ratio of α crystal phase (% by mass) | 83 | 97 | 99 | 97 | 98 | 94 |
|  | Content (parts by mass) | 9.0 | 10.0 | 20.0 | 19.0 | 16.0 | 3.2 |
| Second alumina particle | Alumina raw material | 3 | 1 | 2 | 2 | 2 | 2 |
|  | Oxygen gas supply rate (Nm³/hour) | 15 | 25 | 25 | 25 | 25 | 20 |
|  | Fuel gas (LPG) supply rate (Nm³/hour) | 3 | 5 | 5 | 5 | 5 | 4 |
|  | Average particle diameter (μm) | 9.9 | 1.3 | 6.3 | 7.8 | 8.6 | 7.3 |
|  | Average sphericity | 0.79 | 0.87 | 0.88 | 0.90 | 0.91 | 0.84 |
|  | Content (parts by mass) | 45.0 | 38.0 | 32.0 | 33.0 | 34.0 | 60.0 |

-continued

| | | | | | | | |
|---|---|---|---|---|---|---|---|
| Third alumina particle | Alumina raw material | 6 | 3 | 6 | 6 | 6 | 6 |
| | Oxygen gas supply rate (Nm$^3$/hour) | 75 | 60 | 75 | 125 | 50 | 75 |
| | Fuel gas (LPG) supply rate (Nm$^3$/hour) | 15 | 10 | 15 | 25 | 10 | 15 |
| | Average particle diameter (μm) | 88.0 | 10.0 | 100.0 | 93.0 | 90.0 | 91.0 |
| | Average sphericity | 0.91 | 0.88 | 0.91 | 0.99 | 0.79 | 0.9 |
| | Content (parts by mass) | 46.0 | 52.0 | 48.0 | 48.0 | 50.0 | 36.8 |
| Content ratio of α crystal phase in alumina powder (% by mass) | | 62 | 64 | 61 | 61 | 62 | 59 |
| Viscosity (Pa · s) | | 97 | 74 | 75 | 76 | 99 | 97 |
| Thermal conductivity (W/mK) | | 5.0 | 4.1 | 5.3 | 4.9 | 4.7 | 4.1 |

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|
| First alumina particle | Alumina powder | a | b | c | d | e | f | g | h | i | j | k |
| | Average particle diameter (μm) | 0.09 | 1.0 | 1.1 | 0.1 | 0.5 | 0.5 | 0.5 | 0.3 | 0.3 | 0.6 | 0.5 |
| | Average sphericity | 0.91 | 0.88 | 0.86 | 91 | 0.88 | 0.99 | 0.79 | 0.84 | 0.83 | 0.87 | 0.81 |
| | Specific surface area (m²/g) | 22.8 | 2.0 | 1.8 | 20.1 | 3.6 | 5.8 | 6.0 | 5.9 | 5.8 | 4.6 | 6.0 |
| | Content ratio of α crystal phase (% by mass) | 80 | 97 | 99 | 89 | 79 | 97 | 83 | 84 | 83 | 81 | 87 |
| | Content (parts by mass) | 5.3 | 15.4 | 1.8 | 3.4 | 2.3 | 21.0 | 11.0 | 2.3 | 9.8 | 3.2 | 7.3 |
| Second alumina particle | Alumina raw material Oxygen gas supply rate (Nm³/hour) | 15 | 3 | 3 | 1 | 2 | 3 | 3 | 3 | | 3 | 2 |
| | Fuel gas (LPG) supply rate (Nm³/hour) | 3 | 5 | 15 | 15 | 15 | 15 | 15 | 15 | 15 | 15 | 15 |
| | | | | | | | | | | 3 | 3 | 3 |
| | Average particle diameter (μm) | 1.8 | 9.3 | 9.8 | 1.3 | 4.0 | 9.3 | 9.2 | 10.0 | 0.9 | 9.3 | 1.2 |
| | Average sphericity | 0.81 | 0.79 | 0.80 | 0.81 | 0.82 | 0.81 | 0.80 | 0.84 | 0.81 | 0.82 | 0.82 |
| | Content (parts by mass) | 47.0 | 4.8 | 50.1 | 4.9 | 30.0 | 30.0 | 9.8 | 48.0 | 41.0 | 46.0 | 4.5 |
| Third alumina particle | Alumina raw material Oxygen gas supply rate (Nm³/hour) | 3 | 6 | 3 | 3 | 6 | 3 | 6 | 4 | 3 | 6 | 3 |
| | Fuel gas (LPG) supply rate (Nm³/hour) | 15 | 50 | 20 | 20 | 50 | 15 | 50 | 20 | 15 | 50 | 15 |
| | | 3 | 10 | 4 | 4 | 10 | 3 | 10 | 4 | 3 | 10 | 3 |
| | Average particle diameter (μm) | 16.0 | 92.0 | 16.0 | 16.0 | 94.0 | 16.0 | 91.0 | 21.0 | 12.0 | 101.0 | 9.0 |
| | Average sphericity | 0.82 | 0.83 | 0.82 | 0.85 | 0.81 | 0.8 | 0.82 | 0.81 | 0.81 | 0.83 | 0.84 |
| | Content (parts by mass) | 47.7 | 79.8 | 48.1 | 91.7 | 67.7 | 49 | 79.2 | 49.7 | 49.2 | 50.8 | 88.2 |
| Content ratio of α crystal phase in alumina powder (% by mass) | | 63 | 81 | 61 | 89 | 69 | 61 | 65 | 54 | 53 | 55 | 87 |
| Viscosity (Pa·s) | | 118 | 118 | 111 | 110 | 113 | 115 | 114 | 121 | 114 | 110 | 103 |
| Thermal conductivity (W/mK) | | Forming impossible | Forming impossible | Forming impossible | 3.6 | 3.3 | Forming impossible | Forming impossible | Forming impossible | Forming impossible | Forming impossible | 3.4 |

In Tables 2 and 3, the average sphericity of the alumina particle having a projected area equivalent circle diameter of 0.1 μm or more and 10 μm or less was in the range of 0.80 to 0.98 except that the average sphericity thereof was 0.99 in Example 6 and 0.79 in Example 7. In addition, the average sphericity of the alumina particle having a projected area equivalent circle diameter of more than 10 μm and 100 μm or less is in the range of 0.80 to 0.98 except that the average sphericity thereof was 0.99 in Example 10 and 0.79 in Example 11.

When the first alumina particle was not included, the thermal conductivity decreased. When the second alumina particle was not included, the fluidity was poor and thus forming was not possible, and the thermal conductivity was not able to be measured. When the third alumina particle was not included, the fluidity was relatively poor, but forming was possible. However, the thermal conductivity was low.

The present application is based on a Japanese patent application filed on Mar. 31, 2020 (Japanese Patent Application No. 2020-063554), the contents of which are incorporated herein by reference.

INDUSTRIAL APPLICABILITY

The alumina powder according to the present embodiment and the resin composition using this alumina powder can be applied to various applications, and are suitable for a heat dissipation component such as a heat dissipation sheet, a heat dissipation grease, a heat dissipation spacer, a semiconductor encapsulant, and a heat dissipation coating material (heat dissipation coating agent).

REFERENCE SIGNS LIST

1 . . . melting furnace, 2 . . . burner, 3 . . . fuel gas supply pipe, 4 . . . supporting gas supply pipe, 5 . . . raw material powder supply pipe, 6 . . . cooling medium supply port, 7 . . . bag filter, 8 . . . blower, 9 . . . R thermocouple.

The invention claimed is:

1. An alumina powder comprising:
   a first alumina particle having an average particle diameter of 0.1 μm or more and less than 1 μm;
   a second alumina particle having an average particle diameter of 1 μm or more and less than 10 μm; and
   a third alumina particle having an average particle diameter of 10 μm or more and 100 μm or less, wherein
   each of the average particle diameters is a particle diameter measured using a laser light diffraction scattering particle size distribution analyzer,
   an average sphericity of the first alumina particle having a projected area equivalent circle diameter of 0.1 μm or more and 1 μm or less as determined by microscopy is 0.80 or more and 0.98 or less,
   a specific surface area of the first alumina particle is 1.9 $m^2/g$ or more and 20.0 $m^2/g$ or less, and a content ratio of an α crystal phase is 80% by mass or more.

2. The alumina powder according to claim 1, wherein the content ratio of the α crystal phase in the alumina powder is 60% by mass or more.

3. A resin composition comprising a resin and the alumina powder according to claim 2.

4. The resin composition according to claim 3, wherein the resin comprises at least one selected from the group consisting of a silicone resin, an epoxy resin, a urethane resin, and an acrylic resin.

5. A heat dissipation component comprising the alumina powder according to claim 1.

6. A resin composition comprising a resin and the alumina powder according to claim 2.

7. The resin composition according to claim 6, wherein the resin comprises at least one selected from the group consisting of a silicone resin, an epoxy resin, a urethane resin, and an acrylic resin.

8. A heat dissipation component comprising the alumina powder according to claim 2.

* * * * *